United States Patent
Nagata et al.

(10) Patent No.: US 6,275,463 B1
(45) Date of Patent: Aug. 14, 2001

(54) OPTICAL HEAD

(75) Inventors: Takayuki Nagata, Hirakata; Akihiro Arai, Soraku-gun; Toru Nakamura, Katano; Takao Hayashi, Toyonaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/064,847

(22) PCT Filed: Oct. 28, 1996

(86) PCT No.: PCT/JP96/03141

§ 371 Date: Apr. 23, 1998

§ 102(e) Date: Apr. 23, 1998

(87) PCT Pub. No.: WO97/15923

PCT Pub. Date: May 1, 1997

(30) Foreign Application Priority Data

Oct. 27, 1995 (JP) .................................................. 7-280372

(51) Int. Cl.[7] .................................................... G11B 7/00
(52) U.S. Cl. ..................... 369/118; 369/44.24; 369/44.42
(58) Field of Search ............................ 369/44.23, 44.24, 369/44.41, 44.42, 118

(56) References Cited

U.S. PATENT DOCUMENTS

| | | | |
|---|---|---|---|
| 4,422,168 | * | 12/1983 | Ito et al. ............................ 369/44.42 |
| 4,654,839 | * | 3/1987 | Endo .................................. 369/44.24 |
| 4,682,316 | | 7/1987 | Tateoka et al. . |
| 4,817,074 | * | 3/1989 | Yamanaka ......................... 369/44.42 |
| 4,926,036 | * | 5/1990 | Maeda ............................... 369/44.23 |
| 5,036,185 | * | 7/1991 | Ando .................................. 369/44.24 |
| 5,113,386 | | 5/1992 | Whitehead et al. . |
| 5,253,236 | * | 10/1993 | Latta et al. ........................ 369/44.24 |
| 5,347,504 | * | 9/1994 | Ito et al. ............................ 369/44.42 |
| 5,434,835 | | 7/1995 | Konno et al. . |
| 5,610,895 | * | 3/1997 | Izumi et al. ....................... 369/44.24 |
| 5,719,835 | * | 2/1998 | Ishika ............................... 369/44.42 |
| 5,909,423 | * | 6/1999 | Fukui et al. ....................... 369/44.24 |

FOREIGN PATENT DOCUMENTS

| | | |
|---|---|---|
| 59-191143 | 10/1984 | (JP) . |
| 4-205726 | 7/1992 | (JP) . |

* cited by examiner

*Primary Examiner*—Nabil Hindi
(74) *Attorney, Agent, or Firm*—Wenderoth, Lind & Ponack, L.L.P.

(57) ABSTRACT

An optical head comprises a photodetector 8 having divided photosensitive areas to detect light 13 reflected from an optical disk 7, means 10, 11, 12 for obtaining track error signal by operating signals from the photosensitive areas. The photodetector 8 has a first division line 9a parallel to an information track on the optical disk and second and third division lines 9b, 9c perpendicular to the first division line 9f and symmetrical to the optical axis. Further, a light-shielding area 8i is provided for shielding a part of the reflected light between the division lines 9b and 9c. The signals are operated to reduce offset of the tracking error signal due to a shift of object lens and a tilt of the optical disk. Accordingly, the optical head of the present invention has a small offset of tracking error signal with a simple structure.

10 Claims, 8 Drawing Sheets

OPTICAL HEAD

TECHNICAL FIELD

The present invention relates to an optical head used for optical recording, reproducing or erasing for information recording media such as an optical disk.

BACKGROUND ART

Many reports have been published on techniques for detecting a tracking error signal in an optical head. Push-pull technique is well known as one of representative techniques and it is used practically.

An optical head using push-pull technique is explained below. In the optical head, a light emitted by a light source is condensed by an object lens to form a light spot on a plane of an optical disk for recording information on which a continuous groove of information track is formed spirally. Two photosensitive areas are provided by dividing a photosensitive area of the photodetector with a division line. The photodetector is shown in FIGS. 1–3 at the left side. The light reflected from the optical disk enters to the photodetector. Two photo-detecting signals from the two photosensitive areas are subjected to differential amplification to generate a tracking error signal. Tracking control is performed by controlling the position of the object lens in response to the tracking error signal. When the light spot is subjected to focus control, light intensity distribution of the reflected light is affected by diffraction at the continuous groove due to a position shift of the light spot from the groove. If the prior art optical head is used for an optical disk, light intensity distribution of the reflected light is known to be ascribed to interference of diffracted light beams of 0th, +1st and −1st orders at the continuous groove. Two hatched areas in circular light beam in FIGS. 1–3 denote interference regions. The light intensities in the two regions become asymmetrical according to the position shift of the spot from the continuous groove, and the differential signal is used as the tracking error signal.

The above-mentioned prior art optical head has a simple structure to detect a tracking detection signal. However, it has a problem that an offset of the tracking detection signal is generated due to tracking movement of the object lens to the information track or to the tilting of the optical disk. This problem is explained below. FIGS. 1–3 show positions of the light beam on the photodetector in three cases and tracking error signals therefor. The abscissa of graphs of tracking error signal in the three cases illustrated at the right side in FIGS. 1–3 denotes a relative position X' of the center of the spot to the track. The tracking error signal shows a waveform schematically when the light spot crosses tracks. FIG. 1 shows a case where the object lens is located above the reference point (X=0). Because the light beam extends symmetrically relative to the division line between the two photosensitive areas, the tracking error signal changes symmetrically with no offset. On the other hand, in a second case where the object lens moves along X direction (or +X direction in the case shown in FIG. 2), the position of the light beam is shifted on the photodetector and the light beam distribution becomes asymmetrical. Then, the tracking error signal has a positive offset relative to the reference voltage. Tracking control performance is deteriorated if a value of (A−B)/(A+B) exceeds 20% where A and B denote the positive and negative maximum voltages of the tracking error signal.

Further, when an optical disk is tilted relative to the photodetector along θ direction, the light beam distribution becomes asymmetrical. FIG. 3 shows a case where an optical disk is tilted in −θ direction. The position of the light beam is also shifted on the photodetector in this case and the light beam distribution becomes asymmetrical relative to the division line. Then, the tracking error signal has an offset. Therefore, if the optical disk is tilted in +θ direction and the object lens is shifted in +X direction, the offset of the tracking error signal increases as a sum of the two causes. In an ordinary optical disk, tolerance of offtrack is about 0.1 μm where off-track denotes a shift of position of zero tracking error signal relative to the track center. Tracking control for an optical disk is usually needed in a range of about 200 μm of the shift of the object lens and in a range of about 1° of tilt of the optical disk. However, in the prior art push-pull optical head, if X is 100 μm and the tilt along θ direction is 0.5°, the value of (A−B)/(A+B) is 35% and off-track is 0.12 μm. Therefore, the two values exceed the tolerances.

Because the prior art optical head using push-pull technique has the above-mentioned characteristics, an apparatus for reproducing an optical disk with the prior art optical head needs a means for carrying the optical head at a fast speed precisely for fast search to an object information track or for an optical disk having a large eccentricity such as about 100 μm. Then, though the optical head of simple structure is installed, the optical disk reproducing apparatus becomes expensive. Further, because the means for carrying the optical head needs fast speed and high precision, it is not easy to increase tolerance for external shock and vibrations. Therefore, the optical head of push-pull technique is difficult to be installed in a portable optical disk reproducing apparatus.

A push-pull system is used in a focus and tracking error detector apparatus described in U.S. Pat. No. 5,113,386 by Whitehead et al. In order to make the tracking error output signal insensitive on side areas in a detector array, the detector array has a plurality of detectors, and masks or open areas are positioned at side areas outside the central areas including regions where the zeroth order diffraction beam overlaps the first order beams. However, this push-pull system does not solve the above-mentioned problem on the offset of the tracking error signal.

The present invention intends to solve the aforementioned problems, and its object is to provide an optical head which has a simple structure as the optical head of push-pull technique and reduces an offset of tracking error signal due to shift of the object lens and tilt of optical disk.

DISCLOSURE OF THE INVENTION

In one aspect of the present invention, an optical head comprises a light source which emits a light condensed by an optical system. A focus controller controls the optical system to form a light spot on an information recording medium. A photodetecting means has a first division line dividing the light beams and at least one light-shielding area arranged symmetrically to the first division line. The photodetecting means divides a light reflected from the information detection medium to a plurality of light beams and detects the plurality of light beams. An operator operates signals of the plurality of light beams detected by the photodetecting means to supply a tracking error signal. Then, a tracking controller controls the optical system according to the tracking error signal to make the light spot follow an information track formed on the information recording medium. In the photodetecting means, a first division line divides the light beam reflected from the information recording medium into, for example, two, and at least one light-shielding area is arranged symmetrically to the first division line and shields a part of a region (preferably a region wherein first order diffraction light beams reflected from the information recording medium overlap with each other). Thus, the light beam is divided by the first division line except the regions covered by the light-shielding area where the light intensity distribution is affected largely by tilt of optical disk. Thus, the offset of tracking error signal due to tilt of an optical disk is decreased.

Preferably, the width V of the light-shielding area along the same direction as the first division line satisfies a following relation:

$$0.1\sqrt{1-\left(\frac{1}{4}\right)\left(\frac{\lambda}{NAd}\right)^2} < \left(\frac{V}{D}\right) < 0.5\sqrt{1-\left(\frac{1}{4}\right)\left(\frac{\lambda}{NAd}\right)^2}, \quad (1)$$

wherein D is diameter of light beam, NA is numerical aperture, $\lambda$ is wavelength and d is a track pitch of the information track. If a plurality of divided light beams is detected by setting the width V as explained above, the optical intensity can be sufficient for deriving the tracking error signal while the regions which are liable to be affected by tilt of optical disk are shielded. Then, the tracking error signal is not largely affected by tilt of optical disk. Further, if the light-shielding area extends in parallel to moving direction of the object lens, even if the reflected light beam is shifted due to movement of the object lens, a similar advantage is realized.

In another aspect of the present invention, in the photodetecting means, second and third division lines perpendicular to the first division line further divide the light beam besides the first division line. Then, the light beam is divided into, for example, six to detect the light. Further, at least one light-shielding area is arranged to extend symmetrically to the first division line. Thus, the photodetecting means divides the light beam into regions affected largely due to overlapping of zeroth and first order diffraction light beams in the light reflected from the information recording medium. Thus, the offset of tracking error signal due to shift of the reflected beam can be corrected selectively. Preferably, the distance U between the second and third division lines satisfies a following relation:

$$0.8\sqrt{1-\left(\frac{1}{4}\right)\left(\frac{\lambda}{NAd}\right)^2} < \left(\frac{U}{D}\right) < 1.1\sqrt{1-\left(\frac{1}{4}\right)\left(\frac{\lambda}{NAd}\right)^2}, \quad (2)$$

wherein D is diameter of light beam, NA is numerical aperture, $\lambda$ is wavelength and "d" is a track pitch of the information track. Then, the photosensitive areas outside the second and third division lines do not include all or almost all the interference regions. Therefore, signals which are affected little by tilt of optical disk and corresponds to the shift of the reflected beams can be taken out selectively. Thus, the offset due to shift of the reflected beam can be corrected advantageously.

In a third aspect of the invention, the light-shielding area comprises a first light-shielding portion extending symmetrically from the first division line in two directions, and second and third light-shielding portions provided outside the boundaries of the first light-shielding portion (or peripheries of the light beam). By providing the second and third light-shielding portions, even if the beam reflected from an optical disk is shifted, areas for detecting tracking error signal is limited to equal distance from the first division line. Thus, the offset of tracking error signal due to shift of the light beam becomes small, and the offset is decreased. Preferably, the distance between the second and third light-shielding portions satisfies a following relation:

$$1-\left(\frac{3a}{D}\right) < \frac{W}{D} < 1-\left(\frac{a}{D}\right), \quad (3)$$

wherein D is diameter of light beam and a is maximum shift of light beam.

An advantage of the present invention is that the optical head supplies a tracking error signal having small offset due to shift of object lens along tracking direction.

An advantage of the present invention is that the optical head supplies a tracking error signal having small offset due to tilt of optical disk.

BEST MODE FOR CARRYING OUT THE INVENTION

Figure 1:
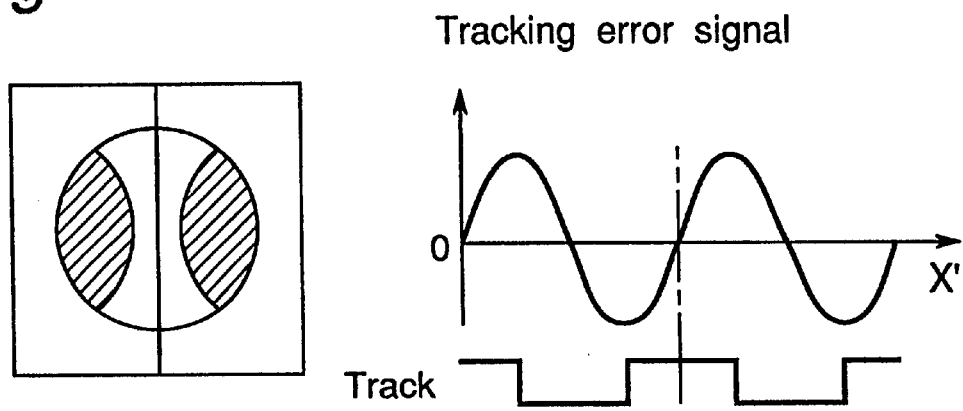
FIG. 1 is a diagram of a position of the light beam on a photodetector and of a tracking error signal in a case where an object lens is located at a reference position and an optical disk is not tilted.
Figure 2:
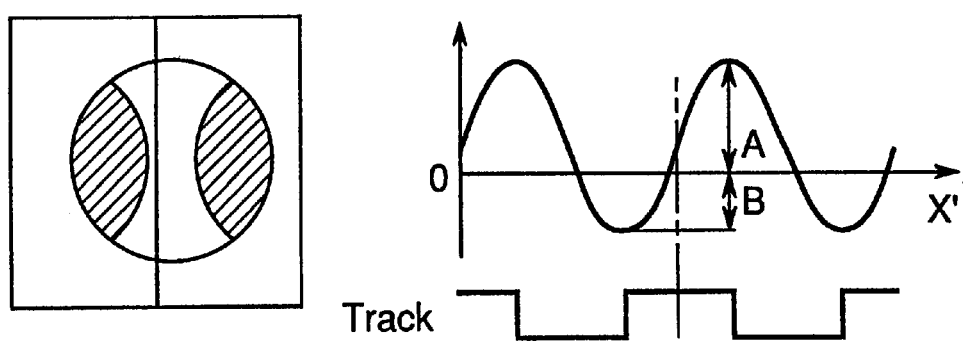
FIG. 2 is a diagram of a position of the light beam on a photodetector and of a tracking error signal in another case where the object lens is shifted in +X direction.
Figure 3:
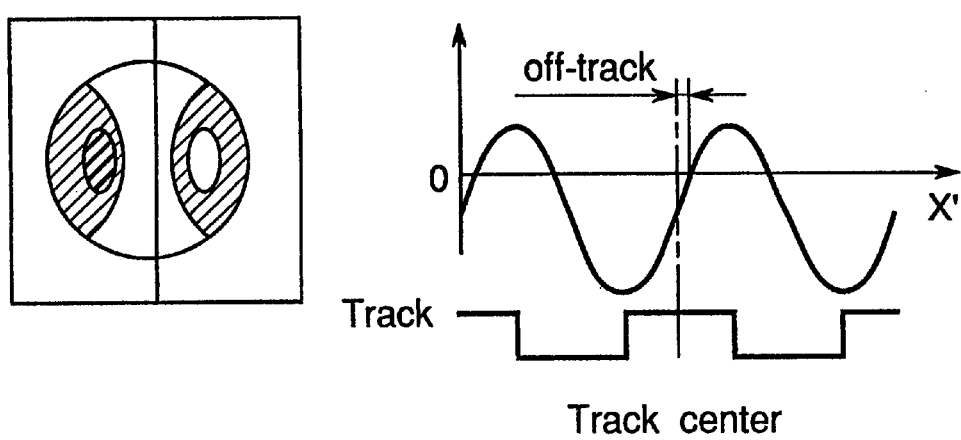
FIG. 3 is a diagram on position of the light beam on a photodetector and of a tracking error signal in a further case where the object lens is located at a reference position and the optical disk is tilted in −θ direction.

Referring now to the drawings, wherein like reference characters designate like or corresponding parts throughout the views, preferred embodiments of the invention are explained below in detail.

Embodiment 1

Figure 4:
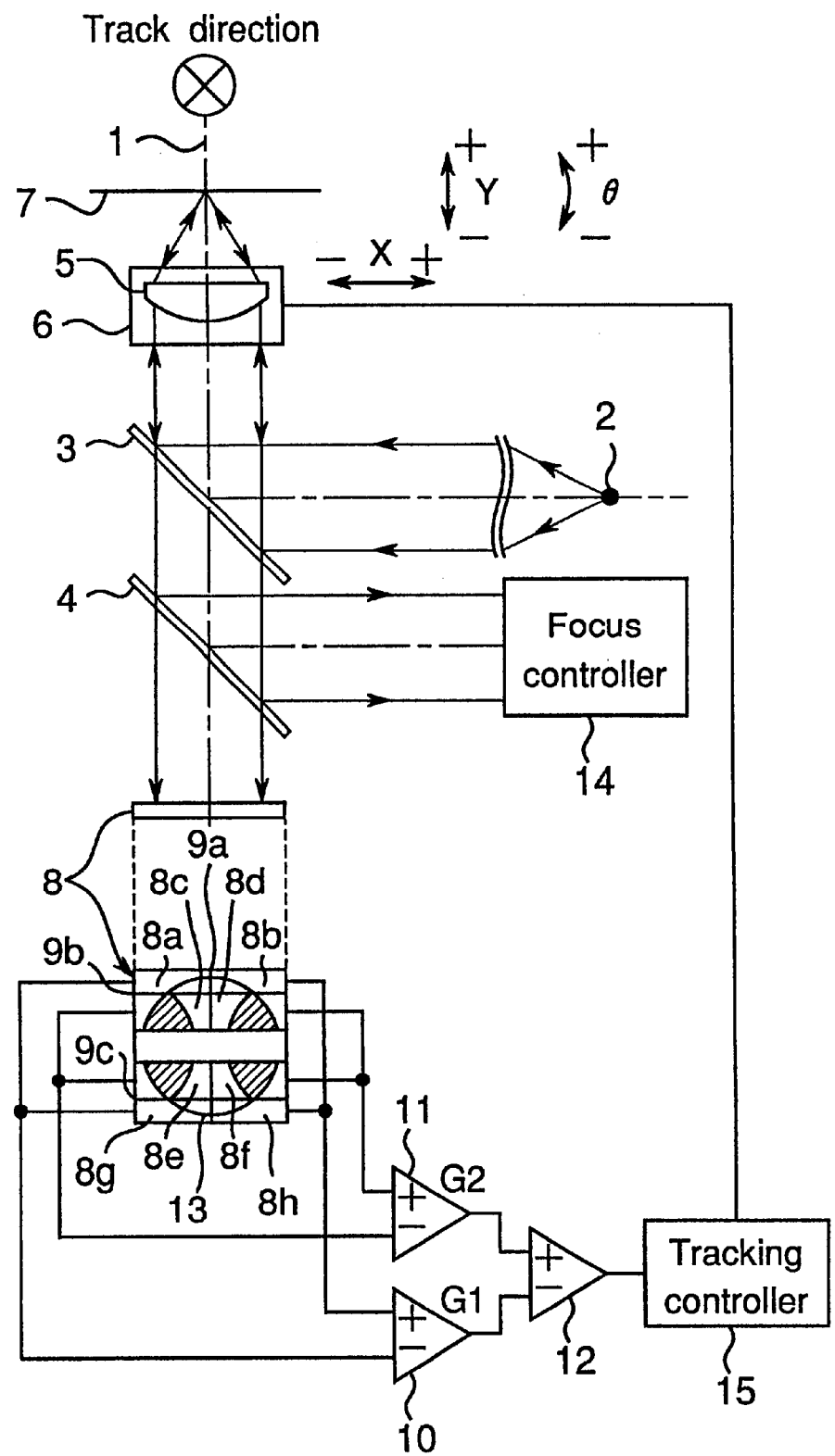
FIG. 4 is a schematic sectional view of an optical head according to a first embodiment of the invention.

FIG. 4 shows an optical head according to a first embodiment of the invention. In the optical head, an object lens 5 opposes an optical disk 7 as an example of a medium for recording information optically. A continuous groove as an information track is formed spirally on the optical disk, and the tangent direction of the groove is vertical to this sheet of paper in FIG. 4. An actuator 6 moves the object lens 5 in X and Y directions under the control of a focus controller 14 and a tracking controller 15, where the Y direction is perpendicular to the disk surface and the X direction is parallel with the disk surface and perpendicular to the tracks. Two half-mirrors 3 and 4 are arranged between the object lens 5 and a photodetector 8 along the optical axis 1 of the optical head at an angle of 45° relative to the optical axis 1. A light source 2 is located off the optical axis 1, laterally to the first half-mirror 3. A light beam emitted by the light source 2 is reflected by the half-mirror 3 to enter to the object lens 5. The light beam condensed by the optical system forms a light spot on the optical disk 7. The light reflected from the optical disk 7 propagates through the object lens 5 and the first and half-mirror 3 and is split by the second half-mirror 4 into two light beams. One of the two light beams reflected by the second half-mirror 4 enters into the focus controller 14 as focus error signal. The focus controller 14 makes the light spot follow the information track formed on the optical disk 7 by controlling the actuator 6 in response to a focus error signal to move the object lens 5 along the ±Y direction so that the light spot is formed on the plane on which information is recorded. On the other hand, the other of the two light beams transmitting the second half-mirror 4 enters into the photodetector 8. As will be explained later, the photodetector 8 divides the light beam and outputs a plurality of photosensitive areas in correspondence to a plurality of the divided light beams. The output signals are supplied through differential amplifiers 10, 11 and 12 as a calculation device to the tracking controller 15 as a means for controlling tracking. In FIG. 4, the photodetector 8 is also illustrated as a partial plan view as observed from the optical axis for illustrating connection of the output signals to the differential amplifiers 10–12. The tracking controller 15 controls the actuator 6 to move the object lens 5 in +X directions in order to guide the light spot to the center of the continuous groove of information track in response to tracking error signal.

Figure 5:
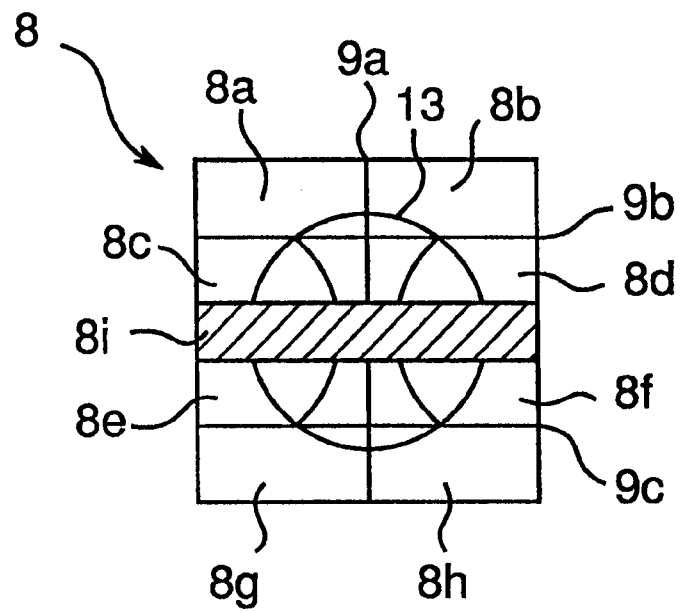
FIG. 5 is a plan view of a photodetector according to a first embodiment of the invention.

FIG. 5 shows the photodetector 8 having a plurality of divided photosensitive areas according to this embodiment. The photodetector 8 has a rectangular photosensitive area wider than a light beam 13 incident on the photodetector 8. In the photosensitive area, in order to divide the reflected light beam into a plurality of light beams, a division line 9a is provided for bisecting the reflected light beam in the vertical direction, and two division lines 9b and 9c perpendicular to the division line 9a are further provided above and below symmetrically with respect to the optical axis. The division line 9a is set to be parallel to a direction corresponding to the information track optically. Further, a light-shielding area 8i is provided between the division lines 9b and 9c, perpendicular to the division line 9a. The light-shielding area 8i is arranged symmetrically relative to the division line 9a to shield a part of a region where 0th, +1st and −1st order diffraction light beams in the light beam reflected from the information track overlap with each other. Thus, the three division lines 9a, 9b and 9c and the light-shielding area 8i divide the photosensitive area of the photodetector 8 into eight divided areas 8a, 8b, 8c, 8d, 8e, 8f, 8g and 8h. It is to be noted that the areas 8c and 8e are not necessarily a single connected area, and may may comprises two or more subareas in correspondence to the shape of the light-shielding area 8i. In the example shown in FIG. 5, the areas 8c and 8e are separated. This holds also for the fourth area 8d, 8f.

Thus, the reflected light beam from the optical disk is divided into six regions by the first, second and third division lines 9a, 9b and 9c except the light-shielding area 8i. If the photosensitive area is observed vertically with respect to the first division line 9a, the top left side comprises a first area 8a, the top right side comprises a second area 8b, the central left side comprises a third area 8c, 8e, the central right side comprises a fourth area 8d, 8f, the bottom left side comprises a fifth area 8g and the bottom right side comprises a sixth area 8h. Then, the reflected beam incident on the six areas are operated as follows: A difference of a sum of detection signals of light beams on the first and the fifth areas 8a, 8g from another sum of those on the second and sixth areas 8b, 8h is calculated. Further, a difference of a sum of detection signals of light beams on the third area 8c, 8e from another sum of those on the fourth area 8d, 8f is calculated. Then, a differential signal of the two differences is calculated as a tracking error signal.

The operation is explained further according to the connections shown in FIG. 4. The first and fifth areas 8a, 8g are connected to −terminal, while the second and sixth areas 8b, 8h are connected to +terminal of the differential amplifier 10. Further, the two areas 8c, 8e of the third area is connected to −terminal, while the two areas 8d, 8f of the fourth area are connected to +terminal of the differential amplifier 11. The output signals of the two differential amplifiers 10 and 11 are connected to +and −terminals of the third differential amplifier 12, and an output signal (or tracking error signal) of the amplifier 12 is supplied to the tracking controller 15. Therefore, by using the connections shown in FIG. 4, a signal TE in proportional to the error tracking signal is obtained as follows:

$$TE = G1\,(8a+8g-8b-8h) - G2(8c+8e-8d-8f), \qquad (5)$$

where 8a–8h denote detection signals of the corresponding areas and G1 and G2 denotes gains of the first and second differential amplifiers 10 and 11. That is, a sum of signals of the areas 8a and 8g is subtracted from a sum of signals of the areas 8b and 8h, and the difference is amplified by the differential amplifier 10 of gain G1, while a sum of signals of the areas 8c and 8e is subtracted from a sum of signals of the areas 8d and 8f and the difference is amplified by the differential amplifier 11 of gain G2. Then, the third differential amplifier 12 amplifies the signal TE to supply the error detection signal.

Figure 6:
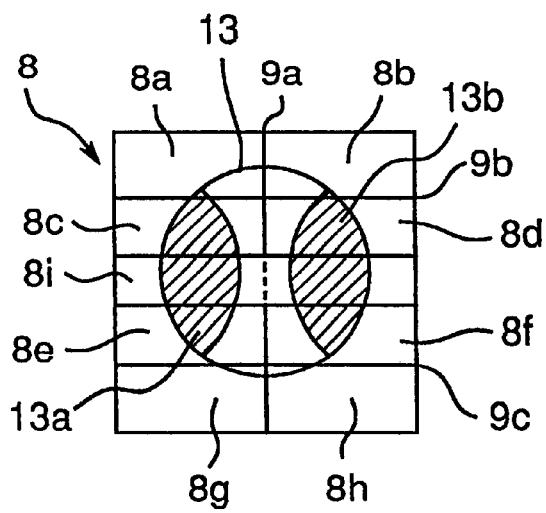
FIG. 6 is a diagram of a position of the light beam on a photodetector in a case where an object lens is located at a reference position and an optical disk is not tilted.
Figure 7:
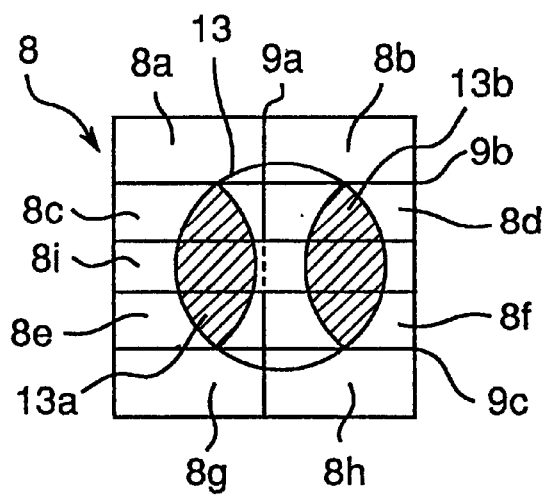
FIG. 7 is a diagram of a position of the light beam on a photodetector in another case where the object lens is shifted in +X direction.
Figure 8:
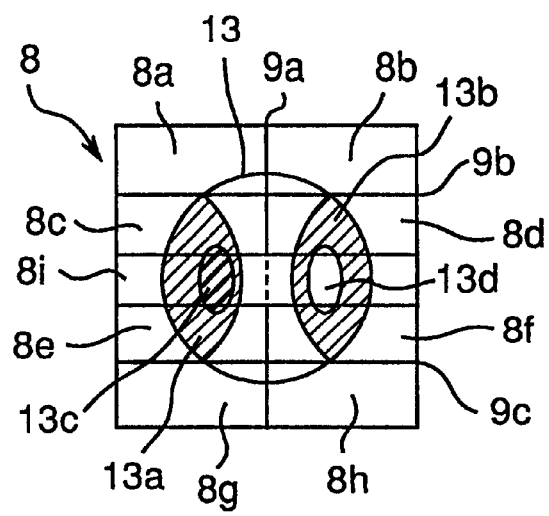
FIG. 8 is a diagram of a position of the light beam on a photodetector in a further case where the object lens is located at a reference position and the optical disk is tilted in −θ direction.

FIGS. 6–8 shows light beams on the photodetector 8 in three cases. FIG. 6 shows a case where an object lens 5 is located at a reference position and an optical disk 7 is not tilted, FIG. 7 shows another case where the object lens 5 is shifted in +X direction, FIG. 8 shows a further case where the object lens is located at a reference position and the optical disk 7 is tilted in −θ direction. In FIGS. 6–8, two hatched areas 13a, 13b shows regions where 0th, +1st and −1st order diffraction light beams overlap with each other.

In the case shown in FIG. 6, the light beam is located symmetrically with respect to the first division line 9a. Therefore, the differential amplifier 12 outputs the tracking error signal with no offset. On the other hand, in the case shown in FIG. 7, the symmetry is broken by shifting the light beam in the right direction. Then, the areas of the light beam 13 included in the areas 8b, 8d, 8f and 8h increases, while the light beam 13 included in the areas 8a, 8c, 8e and 8g decreases. Because the change in light beam distribution appears in the interference regions 13a and 13b, a difference in optical intensity between the areas 8c, 8e and 8d, 8f which includes the interference regions 13a, 13b mainly becomes a problem. In the areas, besides the difference in optical intensity of the interference regions 13a, 13b, an area of incident light of 0th order is changed with a shift of the light beam 13, and this causes an offset. On the other hand, the areas 8a, 8b, 8g and 8h receives mainly the 0th order light, and they are affected by a shift of the light beam. Therefore, if the gains G1 and G2 of the differential amplifiers 10 and 11 are set to have appropriate values, the offset due to the shift of light beam can be corrected selectively by the operation of the above-mentioned signal TE in proportional to the tracking error signal:

$$TE = G1\ (8a+8g-8b-8h) - G2(8c+8e-8d-8f), \quad (4)$$

where 8a–8h denote detection signals of the corresponding areas.

In the case shown in FIG. 8 where the optical disk 7 is tilted, regions 13c and 13d where light intensity difference appears are generated in the interference regions 13a and 13b. However, these regions 13c and 13d are shielded by the light-shielding regions 8i. Therefore, they have little affect on the tracking error signal. Further, because the light-shielding area 8i is provided in parallel to the tracking direction, they have little affect on the tracking error signal even if the object lens 5 is shifted.

Figure 9:
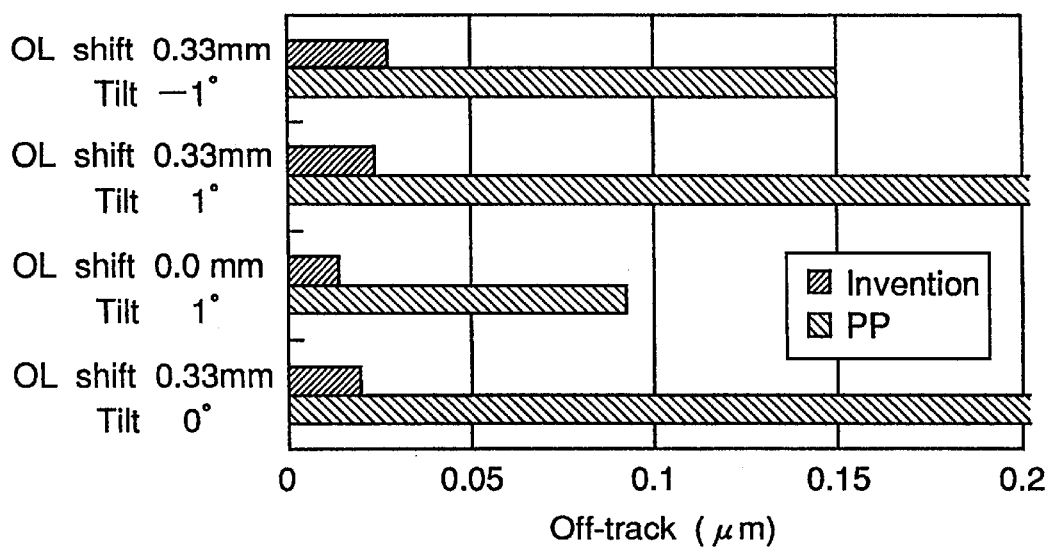
FIG. 9 is a graph of off-track of the optical head in various conditions.
Figure 10:
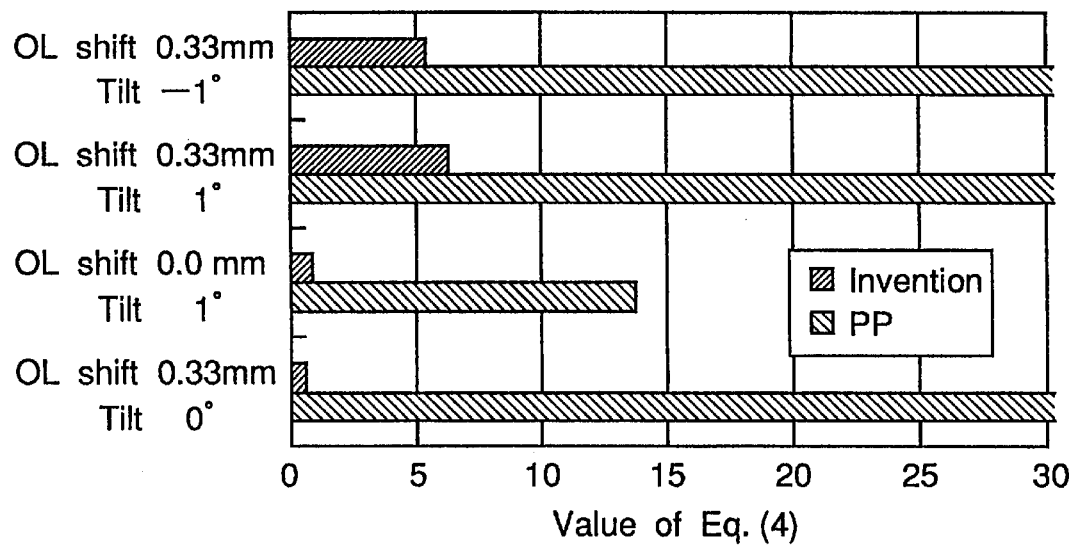
FIG. 10 is a graph of a value of (A−B)/(A+B) for the optical head in various conditions.

FIG. 9 shows results of numerical calculation on the off-track in various conditions for comparing the photodetector of the embodiment with the prior art photodetector of push-pull technique. The off-track is a shift of position of zero tracking error signal relative to the track center when the optical head is shifted from the track center. Further, FIG. 10 shows results of numerical calculation on the value of $$(A-B)/(A+B), \quad (4)$$

in various conditions, where A and B are positive and negative maximum voltages of the tracking error signal. The abscissa in FIGS. 9 and 10 show four conditions as a combination of shift of 0.33 mm of the object lens 5 in radial direction and tilt of 1° of the optical disk 7. In FIGS. 9 and 10, "OL shift" denotes a shift of the object lens 5, "tilt" denotes a tilt of the optical disk 7, "invention" denotes an optical head of the embodiment and "PP" denotes an optical head of prior art push-pull technique.

Calculation conditions are as follows: Width, pitch and depth of the continuous groove of information track on the optical head is 1.1 μm, 100 nm and 1.5 μm, focal length of the object lens 5 is 4 mm, numerical aperture is 0.45, and wavelength of light source 1 is 780 nm. The light beam 13 is divided as follows: U/D=0.82, V/D=0.21, W/D=0.79, gain ratio G2/G1=2.8. It is found that both the off-track and the value of Eq. (5) of the optical head of the embodiment are much lower than the counterparts of the prior art optical head. In other words, for a practical combination of shift of 0.33 mm and tilt of 1°, the results satisfy the conditions of off-track of 0.1 μm or less and the value of Eq. (5) of 20% or less with a sufficient margin.

In this embodiment, by providing the light-shielding region 8i to cover the regions 13c, 13d affected by the tilt of the optical disk 7, the effect of the tilt is suppressed. Further, the reflected beam is divided by the second and third division lines 9b and 9c. Therefore, the offset of the tracking error signal due to shift of the reflected beam 13 can be corrected by operating the signals of the areas 8a, 8b, 8g and 8h multiplied with a specified coefficient with the signals of the areas 8c, 8d, 8e and 8f.

Preferably, the second and third division lines 9b and 9c are set as described below. The distance U between the second and third division lines 9b and 9c is set to satisfy the following equation:

$$0.8\sqrt{1-\left(\frac{1}{4}\right)\left(\frac{\lambda}{NAd}\right)^2} < \left(\frac{U}{D}\right) < 1.1\sqrt{1-\left(\frac{1}{4}\right)\left(\frac{\lambda}{NAd}\right)^2}, \quad (2)$$

wherein D is a diameter of the beam, NA is a numerical aperture, λ is a wavelength and d is a pitch of information tracks. This condition of Eq. (2) on the second and third division lines 9b and 9c is determined so that the interference regions 13a, 13b (refer to FIGS. 6–8) in the reflected beam 13 is not included or nearly included in the first, second, fifth and sixth areas 8a, 8b, 8g and 8h along the direction parallel to the division line 9a or track. Therefore, only the signal in correspondence to the shift of the reflected beam can be taken out selectively, and this is advantageous for correcting the offset of the error correction signal. If the distance U between the second and third division lines 9b and 9c is set to be wider than the range shown in Eq. (2), the signal used for correction becomes smaller. On the other hand, if the distance U between the second and third division lines 9b and 9c is set to be narrower than the range shown in Eq. (2), the interference regions 13a, 13b in the reflected beam 13 affects largely to the signal used for correction, and this deteriorates the quality of tracking error signal.

Preferably, the light-shielding area 8i is set as described below. The width V of the light-shielding area Bi along the same direction as the first division line 9a is set to satisfy the following equation:

$$0.1\sqrt{1-\left(\frac{1}{4}\right)\left(\frac{\lambda}{NAd}\right)^2} < \left(\frac{V}{D}\right) < 0.5\sqrt{1-\left(\frac{1}{4}\right)\left(\frac{\lambda}{NAd}\right)^2}, \quad (1)$$

wherein D is a diameter of the beam, NA is a numerical aperture, λ is a wavelength and d is a pitch of information tracks. The condition of Eq. (1) on light-shielding area 8i is determined so that the regions 13c and 13d which are liable to be affected by tilt of optical disk 7 are shielded while a quantity of signal light for obtaining the tracking error signal can be secured sufficiently. Therefore, by providing the light-shielding area having the width of Eq. (1), the tracking error signal is affected less by the tilt of the optical disk 7. If the width V of the light-shielding area 8i is wider than the range shown in Eq. (1), the quantity of signal light used for correction becomes smaller. On the other hand, if the width V of the light-shielding area 8i is narrower than the range shown in Eq. (1), the interference regions 13c, 13d in the interference regions 13a, 13b affect largely to the signal used for correction, and this deteriorates the quality of tracking error signal. In a different way, the light-shielding area 8i is set to be parallel to the shifting direction of the object lens 5. Then, a similar advantage is obtained even if the reflected beam 13 is moved due to the shift of the object lens 5.

In this embodiment, the light-shielding area 8i is rectangular. However, it may comprise two trapezoids put together to form a substantially same size or it may be curved, as far as the substantially the same area is formed. Further, it may comprise a plurality of separated areas.

Embodiment 2

Figure 11:
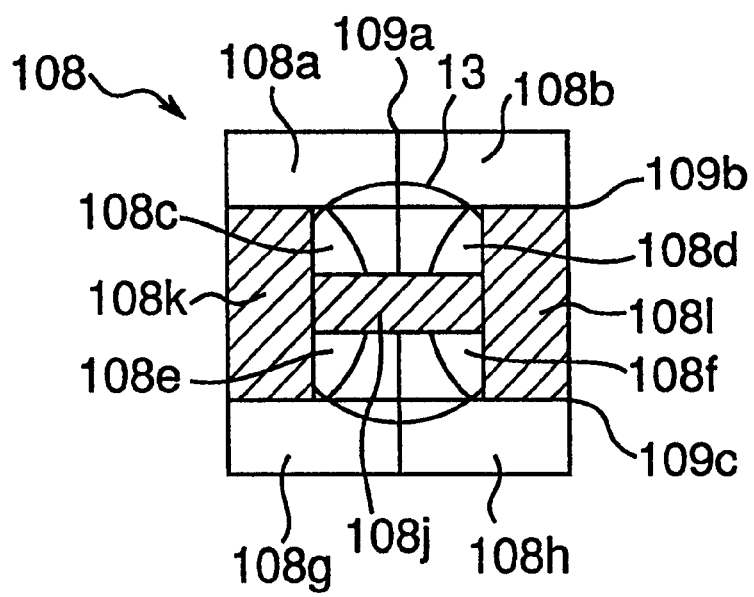
FIG. 11 is a plan view of a photodetector according to a second embodiment of the invention.

FIG. 11 shows division of light beam 13 of a photodetector 108 according to a second embodiment of the invention. This embodiment is different from the first embodiment only in the division of light beam 13. The structure except this point and the operation of the optical head are similar to the counterparts of the first embodiment, and they are not explained here. The photodetector 108 shown in FIG. 11 is different in that areas for shielding the peripheries of the light beam are provided between second and third division lines 109b and 109c.

In a rectangular photosensitive area of the photodetector 108, similarly to the photodetector 8 of the first embodiment, a division line 109a is provided for bisecting the light beam in the vertical direction, and two division lines 109b and 109c perpendicular to the division line 109a are provided symmetrically above and below with respect to the optical axis. The division line 109a is set to be parallel to a direction corresponding to the information track optically. Further, a first light-shielding area 108i is provided between the division lines 109b and 109c, perpendicular to the division line 109a, to shield the light beam, and further to divide the light beam. The first light-shielding area 108j is arranged symmetrically relative to the division line 109a to shield the region 13c and 13d in the interference regions 13a and 13b. Further, second and third areas 108k and 108l are provided to shield the peripheries of the light beam 13 between the second and third division lines 109b and 109c. The second and third light-shielding areas 108k and 108l are arranged symmetrically with respect to the first division line 109a. Then, the three division lines 109a, 109b and 109c and the light-shielding areas 108j, 108k and 108l divide the photosensitive area of the photodetector 108 into eight divided areas 108a, 108b, 108c, 108d, 108e, 108f, 108g and 108h. By providing the second and third light-shielding areas 108k and 108l, the areas for detecting tracking error signal are limited within an equal distance from the first division line 109a at the left and right sides. Then, the correction coefficient G1/G2 in Eq. (5) can be decreased. When the correction coefficient G1/G2 is small, tolerance for a shift from the optimum value becomes large, and the correction coefficient can be set easily.

Preferably, if "a" is maximum shift of the light beam 13 in one side, a width W between inner boundaries of the second and third light-shielding areas 108k and 108l is set to satisfy the following equation:

$$1-\left(\frac{3a}{D}\right)<\frac{W}{D}<1-\left(\frac{a}{D}\right), \quad (3)$$

wherein D is a diameter of the light beam. Then, the light-shielding areas 108k and 108l cover areas not affected largely by the shift of the light beam. If the width W between the second and third light-shielding areas 108k and 108l is set to be wider than the range shown in Eq. (3), the signal used for correction includes signals not affected by the shift of the light beam. On the other hand, if the width W is set to be narrower than the range shown in Eq. (3), the signal used for correction becomes smaller, and this deteriorates the quality of tracking error signal.

Similarly to the first embodiment mentioned above, the width V of the light-shielding area 108j along the same direction as the first division line 109a is set to satisfy the following equation:

$$0.1\sqrt{1-\left(\frac{1}{4}\right)\left(\frac{\lambda}{NAd}\right)^2}<\left(\frac{V}{D}\right)<0.5\sqrt{1-\left(\frac{1}{4}\right)\left(\frac{\lambda}{NAd}\right)^2}, \quad (1)$$

wherein D is a diameter of the beam, NA is a numerical aperture, λ is a wavelength and d is a pitch of information tracks. The condition of Eq. (1) on the light-shielding area 108j is determined so that the regions 13c and 13d which are liable to be affected by tilt of optical disk 7 are shielded while a quantity of signal light for obtaining the tracking error signal can be secured sufficiently.

In this embodiment, the second and third light-shielding areas 108k and 108l have linear boundaries and continuous to the first one 108j. However, they may be curved as far as a substantially same area is formed. Further, each of them may comprise a plurality of separated areas.

Figure 12:
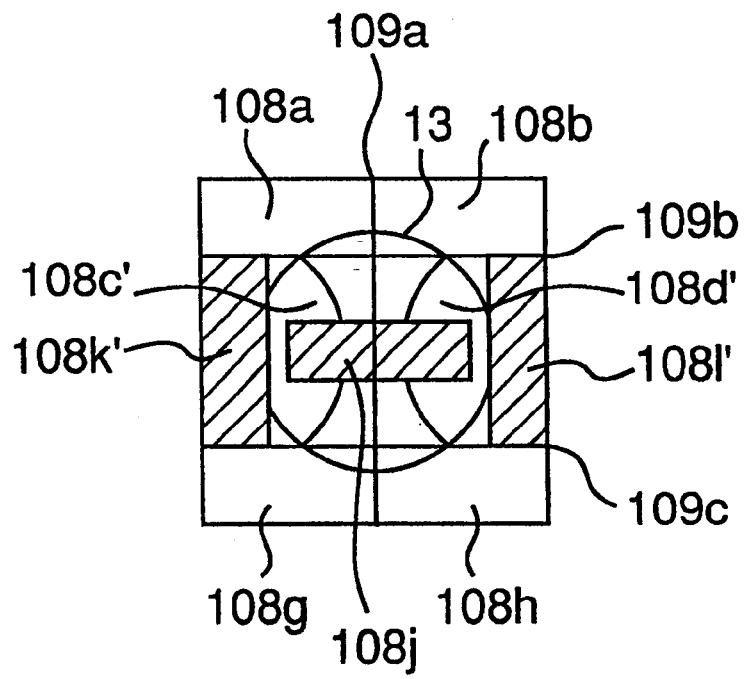
FIG. 12 is a plan view of a photodetector according to another example of the second embodiment of the invention.

FIG. 12 shows division of a light beam of a photodetector according to another example of the second embodiment. Similar to the example shown in FIG. 11, second and third light-shielding areas 108k' and 108l' are provided besides the first one 108j in order to shield the peripheries of the light beam between second and third division lines 109b and 109c. However, the second and third light-shielding areas 108k' and 108l' are not continuous to the first one 108j. In this example, the reflected light beam is divided into six. Because the peripheral areas of the light beam are shielded, the offset of the signal due to shift of light beam can be decreased, and the correction coefficient G1/G2 in Eq. (5) can be easily set.

Figure 13:
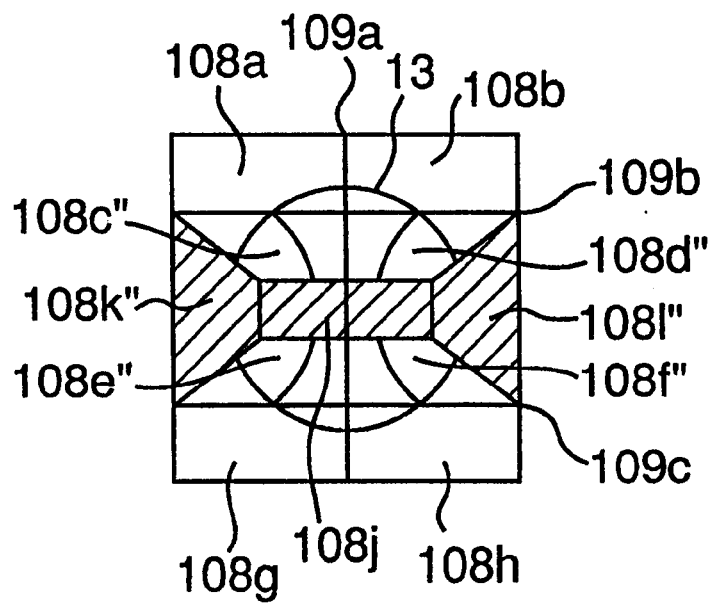
FIG. 13 is a plan view of a photodetector according to a further example of the second embodiment of the invention.

FIG. 13 shows division of a light beam of a photodetector according to a further example of the second embodiment. Similar to the example shown in FIG. 11, second and third light-shielding areas 108k" and 108l" are provided besides the first one 108j in order to shield the peripheries of the light beam between second and third division lines 109b and 109c. The second and third light-shielding areas 108k" and 108l" are continuous to the first one 108j, but the width thereof is not constant. The width increased from the width of the first light-shielding area 108j at the inner side to the distance between the second and third boundaries 109b and 109c of the light-receiving area. Similarly to the above example, because the peripheral areas of the light beam are shielded, the offset of the signal due to shift of light beam can be decreased, and the correction coefficient G1/G2 in Eq. (5) can be set easily.

Embodiment 3

Figure 14:
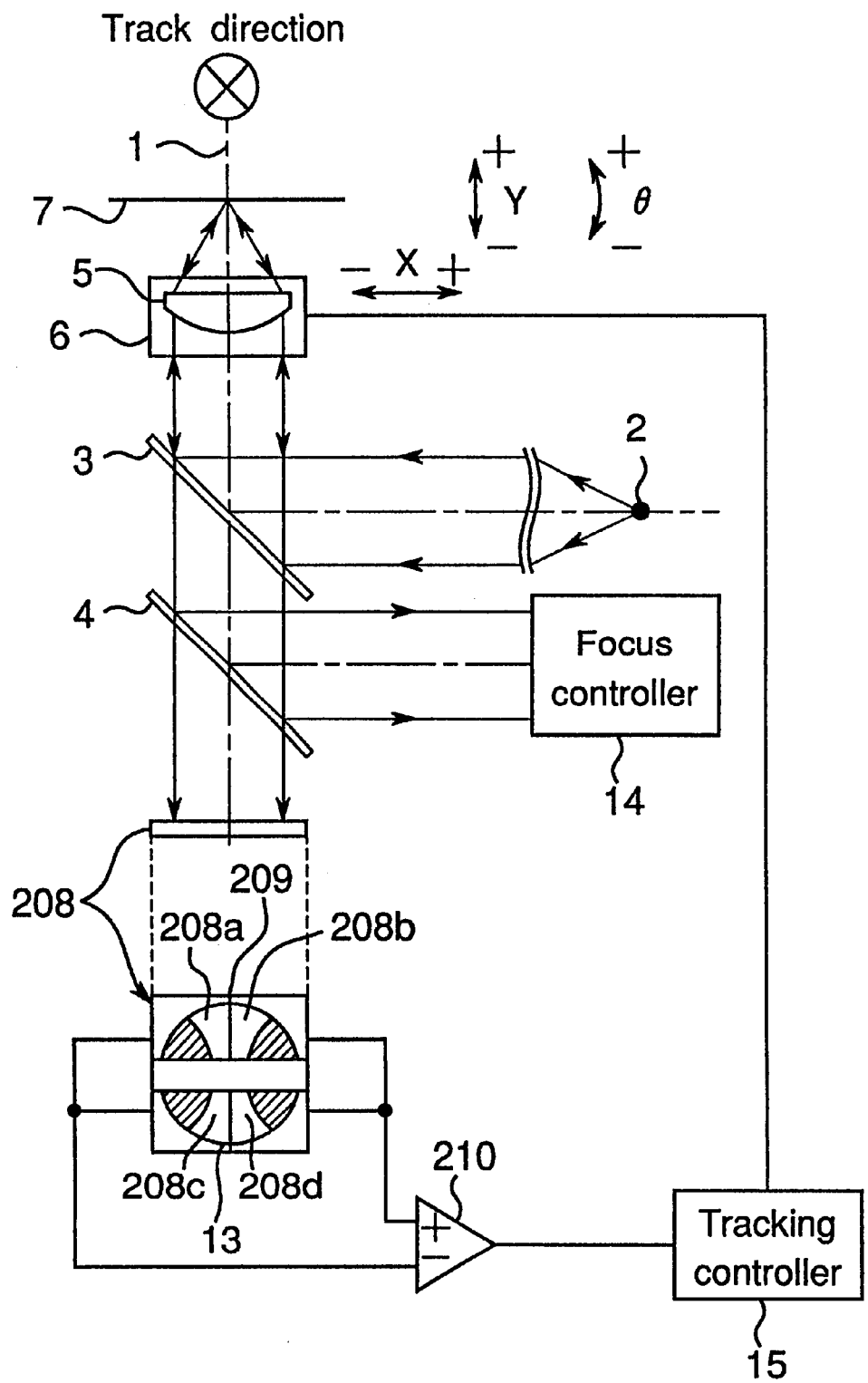
FIG. 14 is a schematic sectional view of an optical head according to a third embodiment of the invention.
Figure 15:
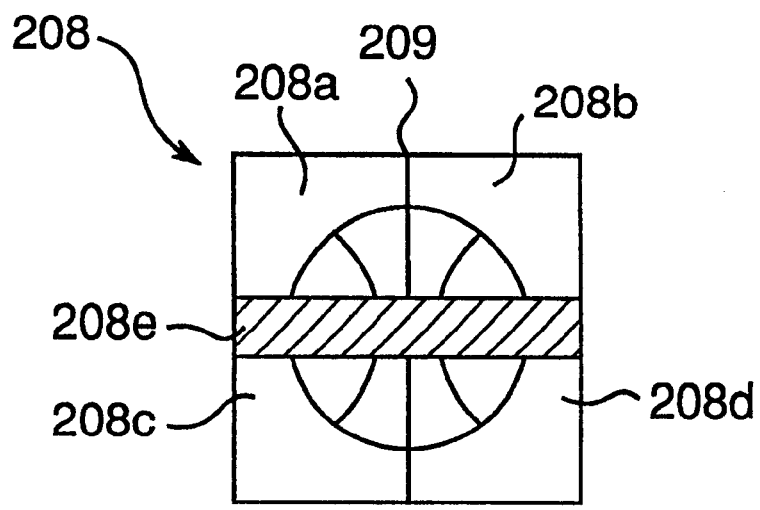
FIG. 15 is a plan view of a photodetector according to the third embodiment of the invention.

FIG. 14 shows an optical head according to a third embodiment of the invention and FIG. 15 shows division of a light beam 13 of a photodetector 208 according to the third embodiment. This embodiment is different from the first embodiment only in the division of light beam 13 and the operation of signals. The structure except this point and the operation of the optical head are similar to the counterparts of the first embodiment, and they are not explained here. The photodetector 208 shown in FIGS. 14 and 15 is different in that division of reflected beam is simple.

In a rectangular photosensitive area of the photodetector 208, similarly to the photodetector 8 of the first embodiment, a division line 209 is provided for bisecting the light beam in the vertical direction. The division line 209 is set to be parallel to a direction corresponding to the information track optically. Further, at least one light-shielding area 208e perpendicular to the division line 209 is arranged symmetrically relative to the division line 209 to shield the regions 13c and 13d to be affected by tilt of the optical disk 7 in the interference regions 13a and 13b where zeroth, +1st and −1st order diffraction light beams overlap with each other. Thus, the photosensitive area of the photodetector 208 is divided by the division line 209 and the light-shielding area 208e is further provided perpendicularly to the division line 209 to form four photosensitive areas 208a, 208b, 208c and 208d.

Because the regions 13c and 13d are covered by the light-shielding area 208e, the offset due to a tilt of the optical disk 7 can be reduced. Then, the optical head can control tracking stably in a condition where the shift of light beam is small so that the offset is mainly caused by the tilt of the optical disk 7.

It is to be noted that the area 208a and 208c are not necessarily separated, or it may comprise two or more subareas in correspondence to the shape of the light-shielding area 208e. In the example shown in FIG. 15, the areas 208a and 208c are separated. This holds also for the second area 208b, 208d. In the operation of signals detected in the areas, the two areas 8a, 8c of a first area is connected to −terminal, while the two areas 8b, 8d of a second area are connected to +terminal of the differential amplifier 210. The output signal of the differential amplifiers 210 is supplied as a tracking error signal to the tracking controller 15.

Preferably, the light-shielding area 208e is set as described below, similarly to the first embodiment. The width V of the light-shielding area 208e along the same direction as the division line 209 is set to satisfy the following equation:

$$0.1\sqrt{1-\left(\frac{1}{4}\right)\left(\frac{\lambda}{NAd}\right)^2} < \left(\frac{V}{D}\right) < 0.5\sqrt{1-\left(\frac{1}{4}\right)\left(\frac{\lambda}{NAd}\right)^2}, \quad (1)$$

wherein D is a diameter of the beam, NA is a numerical aperture, $\lambda$ is a wavelength and d is a pitch of information tracks. The condition of Eq. (1) on the light-shielding area 208e is determined so that the regions 13c and 13d which are liable to be affected by tilt of optical disk 7 are shielded while a quantity of signal light for obtaining the tracking error signal can be secured sufficiently. Therefore, by providing the light-shielding area having the width of Eq. (1), the tracking error signal is affected less by the tilt of the optical disk 7.

It is noted that instead of the light-shielding area 208c, the light-shielding area may comprise three areas as in the second embodiment. In this case, the width W between inner boundaries of the second and third light-shielding areas is set preferably to satisfy Eq. (3).

Figure 16:
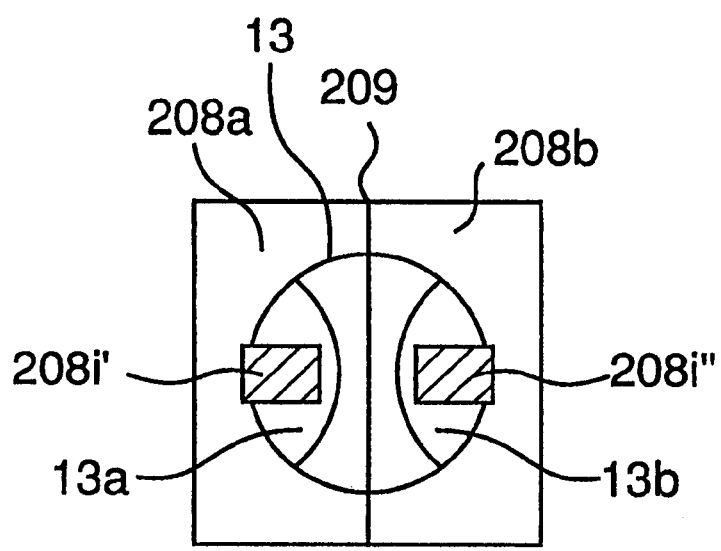
FIG. 16 is a plan view of a photodetector according to a modified example of the third embodiment of the invention.

FIG. 16 shows division of light beam of a photodetector in a modified example of the third embodiment. Two light-shielding areas 208i' and 208i" are provided at two side of the division line 209 symmetrically to the division line 209, but they are separated from each other in contrast to the example shown in FIG. 15. The light-shielding areas 208i' and 208i" are provided to shield areas affected largely by tilt of optical disk 7 in the overlapping areas 13a and 13b. Then, the offset of tracking error signal due to tilt of optical disk can be decreased. It is to be noted that the light-shielding areas 8i and 108i in the examples of the first and second embodiments may also consist of a plurality of parts, similarly to that shown in FIG. 16.

In the above-mentioned embodiments, the reflected beam is divided into a plurality of light beams in the photodetector 8, 108, 208. However, an optical head according to the invention may comprise an optical component which splits a light beam provided in the optical path, instead of the photodetector. For example, the optical component may be a diffraction element having a grating divided into a plurality of parts, or an element comprising a plurality of prisms provided on a plane.

In the above-mentioned embodiments, the information track of the optical disk comprises a continuous groove. However, if the differential amplifiers 10, 11, 12, 210 and the tracking controller 15 have an appropriate characteristic of low-pass filter, tracking error signal of small offset can be obtained also for an information track comprising a pit array.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An optical head comprising:

a light source;

an optical system which condenses a light emitted from said light source;

a focus controller operable to control said optical system to form a light spot on an information recording medium;

a photo-detecting device operable to detect a plurality of light beam portions in a light beam reflected from the information recording medium;

a processing device operable to process signals of the plurality of light beam portions detected by said photo-detecting device to supply a tracking error signal; and a tracking controller operable to control said optical system according to the tracking error signal to make the light spot follow an information track formed on the information recording medium;

wherein a boundary between the plurality of light beam portions to be detected by said photo-detecting device is defined by a first division line, the first division line extending along a direction of the information track, and wherein at least one light-shielding area is arranged along a second line, the second line extending through a center of the light beam and being perpendicular to the first division line, so that both portions of each respective one of said at least one light-shielding area on opposite sides of the second line are symmetrical with respect to the second line; and wherein a width V of said at least one light-shielding area along the same direction as the first division line satisfies a following relation:

$$0.1\sqrt{1-\left(\frac{1}{4}\right)\left(\frac{\lambda}{NAd}\right)^2} < \left(\frac{V}{D}\right) < 0.5\sqrt{1-\left(\frac{1}{4}\right)\left(\frac{\lambda}{NAd}\right)^2},$$

wherein D is a diameter of light beam in a plane where the plurality of light beam portions are detected by said photodetecting device, NA is a numerical aperture of said optical system, X is a wavelength and d is a track pitch of the information track.

2. An optical head comprising:

a light source;

an optical system which condenses a light emitted from said light source;

a focus controller operable to control said optical system to form a light spot on an information recording medium;

a photo-detecting device operable to detect a plurality of light beam portions in a light beam reflected from the information recording medium;

a processing device operable to process signals of the plurality of light beam portions detected by said photo-detecting device to supply a tracking error signal; and a tracking controller operable to control said optical system according to the tracking error signal to make the light spot follow an information track formed on the information recording medium;

wherein a boundary between the plurality of light beam portions to be detected by said photo-detecting device is defined by a first division line, the first division line extending along a direction of the information track, and wherein at least one light-shielding area is arranged along a second line, the second line extending through a center of the light beam and being perpendicular to the first division line, so that both portions of each respective one of said at least one light-shielding area on opposite sides of the second line are symmetrical with respect to the second line; and wherein said at least one light-shielding area comprises a first light-shielding portion extending in two sides of the first division line, and second and third light-shielding portions provided at outer sides of said first light-shielding portion with respect to the first division line.

3. An optical head comprising:

a light source;

an optical system which condenses a light emitted from said light source;

a focus controller operable to control said optical system to form a light spot on an information recording medium;

a photo-detecting device operable to detect a plurality of light beam portions in a light beam reflected from the information recording medium;

a processing device operable to process signals of the plurality of light beam portions detected by said photo-detecting device to supply a tracking error signal; and a tracking controller operable to control said optical system according to the tracking error signal to make the light spot follow an information track formed on the information recording medium;

wherein a boundary between the plurality of light beam portions to be detected by said photo-detecting device is defined by a first division line, the first division line extending along a direction of the information track, and wherein at least one light-shielding area is arranged along a second line, the second line extending through a center of the light beam and being perpendicular to the first division line, so that both portions of each respective one of said at least one light-shielding area on opposite sides of the second line are symmetrical with respect to the second line; and wherein said photodetecting device is operable to receive the light beam portions defined by the first division line and second and third division lines crossing the first division line, and said at least one-light shielding area is arranged between the second and third division lines, and tracking error signal TE is obtained according to a following relationship:

$$TE = (Ic - Id) - G^*(Ia - Ib)$$

wherein said photodetecting device is divided into first and second areas defined by the fist, second, and third lines except the light-shielding area, the first area being defined as an area extending in a side relative to the first division line, the second area being defined as an area extending in the other side relative to the first division line, and third and fourth areas defined as areas outside the first and second areas, the third area being defined as areas extending in the side relative to the first division line, the fourth area being defined as areas extending in the other side relative to the first division line, G representing a correction gain, Ia, Ib, Ic, and Id representing signals detected in the third, fourth, first, and second areas.

4. The optical head according to claim 3, wherein a distance U between the second and third division lines satisfies a following relation:

$$0.8\sqrt{1-\left(\frac{1}{4}\right)\left(\frac{\lambda}{NAd}\right)^2} < \left(\frac{U}{D}\right) < 1.1\sqrt{1-\left(\frac{1}{4}\right)\left(\frac{\lambda}{NAd}\right)^2},$$

wherein D is a diameter of light beam in a plane where the plurality of light beam portions are detected by said photo-detecting device, NA is a numerical aperture of said optical system, $\lambda$ is a wavelength and d is a track pitch of the information track.

5. The optical head according to claim 2 wherein a distance W between inner boundaries of said second and third light-shielding portions satisfies a following relation:

$$1 - \left(\frac{3a}{D}\right) < \frac{W}{D} < 1 - \left(\frac{a}{D}\right),$$

wherein "a" is maximum shift of light beam in a plane where the plurality of light beam portions are detected by said photodetecting device and D is a diameter of light beam in the plane including the plurality of light beam portions detected by said photodetecting device.

6. The optical head according to claim 3, wherein said at least one light-shielding area comprises a first light-shielding portion at two sides of the first division line, and second and third light-shielding portions provided at outer sides of said first light-shielding portion with respect to the first division line.

7. The optical head according to claim 6, wherein a distance U between the second and third division lines satisfies a following relation:

$$0.8\sqrt{1-\left(\frac{1}{4}\right)\left(\frac{\lambda}{NAd}\right)^2} < \left(\frac{U}{D}\right) < 1.1\sqrt{1-\left(\frac{1}{4}\right)\left(\frac{\lambda}{NAd}\right)^2},$$

wherein D is a diameter of light beam in a plane where the plurality of light beam portions are detected by said photo-detecting device, NA is a numerical aperture of said optical system, $\lambda$ is a wavelength and d is a track pitch of the information track.

8. The optical head according to claim 7 wherein a distance U between said second and third light-shielding portions satisfies a following relation:

$$1-\left(\frac{3a}{D}\right)<\frac{W}{D}<1-\left(\frac{a}{D}\right),$$

wherein D is a diameter of light beam in the plane where the plurality of light beam portions are detected by said photodetecting device and "a" is maximum shift of light beam in the plane where the plurality of light beam portions are detected by said photodetecting device.

9. The optical head according to claim 3, wherein said photodetecting device receives six light beam portions defined by first, second and third division lines and said at least one light-shielding area extends between the second and third division lines so as not to divide each of two light beam portions surrounded by the first to third lines into two.

10. The optical head according to claim 3, wherein said photodetecting device receives eight light beam portions defined by the first, second and third division lines and said at least one light-shielding area, said at least one light-shielding area extending to divide each of two light beam portions surrounded by the first to third lines into two.

* * * * *

UNITED STATES PATENT AND TRADEMARK OFFICE
CERTIFICATE OF CORRECTION

PATENT NO.    : 6,275,463 B1                                    Page 1 of 1
DATED         : August 14, 2001
INVENTOR(S)   : Nagata et al.

It is certified that error appears in the above-identified patent and that said Letters Patent is hereby corrected as shown below:

Column 12,
Lines 48 and 49, please delete "second" and replace with -- first --

Column 13,
Lines 25, 26, 61 and 62, please delete "second" and replace with -- first --

Column 14,
Line 8, please delete "fist" and replace with -- first --

Signed and Sealed this

Sixteenth Day of April, 2002

Attest:

JAMES E. ROGAN
Attesting Officer        Director of the United States Patent and Trademark Office